United States Patent
Palmer et al.

(10) Patent No.: US 10,358,154 B1
(45) Date of Patent: *Jul. 23, 2019

(54) RAIL VEHICLE EVENT DETECTION AND RECORDING SYSTEM

(71) Applicant: SmartDrive Systems, Inc., San Diego, CA (US)

(72) Inventors: Jason Palmer, Carlsbad, CA (US); Slaven Sljivar, San Diego, CA (US); Mark Freitas, San Diego, CA (US); Daniel A. Deninger, San Diego, CA (US); Shahriar Ravari, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,951

(22) Filed: Apr. 13, 2017

Related U.S. Application Data

(63) Continuation of application No. 14/525,416, filed on Oct. 28, 2014, now Pat. No. 9,663,127.

(51) Int. Cl.
*B61L 15/00* (2006.01)
*B61L 27/00* (2006.01)
(Continued)

(52) U.S. Cl.
CPC ....... *B61L 15/0027* (2013.01); *B61L 15/0072* (2013.01); *B61L 27/0077* (2013.01); *G06K 9/00791* (2013.01); *H04N 7/181* (2013.01)

(58) Field of Classification Search
CPC .......... B61L 25/02; G07C 5/08; G07C 5/008; G07C 5/0866
(Continued)

(56) References Cited

U.S. PATENT DOCUMENTS

| 7,398,140 B2 * | 7/2008 | Kernwein | B61L 23/00 246/115 |
| 2002/0059075 A1 | 5/2002 | Schick | |

(Continued)

FOREIGN PATENT DOCUMENTS

| EP | 1825339 | 8/2007 |
| EP | 2743117 | 6/2014 |

(Continued)

*Primary Examiner* — Anne M Antonucci
(74) *Attorney, Agent, or Firm* — Esplin & Associates, PC

(57) ABSTRACT

This disclosure relates to a system and method for detecting and recording rail vehicle events. The system comprises one or more cameras, one or more sensors, non-transient electronic storage, one or more physical computer processors, and/or other components. The one or more cameras may be configured to acquire visual information representing a rail vehicle environment. The one or more sensors may be configured to generate output signals conveying operation information related to operation of the rail vehicle. The non-transient electronic storage may be configured to store electronic information. The one or more physical computer processors may be configured to detect rail vehicle events based on the output signals and facilitate electronic storage of the visual information and the operation information for a period of time that includes the rail vehicle event in the non-transient electronic storage.

14 Claims, 7 Drawing Sheets

(51) Int. Cl.
*H04N 7/18* (2006.01)
*G06K 9/00* (2006.01)

(58) Field of Classification Search
USPC .......................................................... 701/19
See application file for complete search history.

(56) References Cited

U.S. PATENT DOCUMENTS

| | | | |
|---|---|---|---|
| 2007/0040672 A1* | 2/2007 | Chinigo | G07C 5/085 340/539.22 |
| 2007/0216771 A1* | 9/2007 | Kumar | B61L 23/044 348/148 |
| 2007/0217670 A1* | 9/2007 | Bar-Am | B61K 9/08 382/141 |
| 2007/0257804 A1* | 11/2007 | Gunderson | G07C 5/0891 340/576 |
| 2008/0147267 A1 | 6/2008 | Plante | |
| 2011/0216200 A1 | 9/2011 | Chung | |
| 2011/0285842 A1 | 11/2011 | Davenport | |
| 2012/0130563 A1* | 5/2012 | McBain | B64D 45/0015 701/3 |
| 2012/0203402 A1* | 8/2012 | Jape | B61L 27/0027 701/19 |
| 2014/0047371 A1 | 2/2014 | Palmer | |

FOREIGN PATENT DOCUMENTS

| | | |
|---|---|---|
| GB | 2541710 | 3/2017 |
| WO | 2006065329 | 6/2006 |
| WO | 2010042309 | 4/2010 |

* cited by examiner

400

RAIL VEHICLE EVENT DETECTION AND RECORDING SYSTEM

FIELD

This disclosure relates to a system and method for detecting and recording rail vehicle events.

BACKGROUND

Typically, trains are not equipped with vehicle event detection systems. Some trains are equipped with cameras but these cameras are usually only used for surveillance purposes to monitor interior passenger compartments. The cameras are not connected to mechanical and/or safety subsystems of the train in any way.

SUMMARY

One aspect of the disclosure relates to a rail vehicle event detection system for detecting and recording rail vehicle events. The rail vehicle event detection system may be configured to be coupled with a rail vehicle. In some implementations, the rail vehicle event detection system may be electrically isolated from the rail vehicle. In some implementations, the system may include one or more of an operator identity system, a camera, a transceiver, a sensor, a backup power system, electronic storage, a processor, a user interface, and/or other components.

Operator identity information may be received by the operator identity system. The operator identity information may identify periods of time that individual operators operate the rail vehicle. In some implementations, receiving operator identity information may include receiving entry and/or selection of the operator identity information from operators of the rail vehicle at the rail vehicle. In some implementations, receiving operator identity information may include receiving the operator identity information from a remotely located computing device. In some implementations, receiving operator identity information may include receiving operator identity information from a biometric sensor configured to generate output signals that convey biometric information that identifies an individual operator of the rail vehicle.

Visual information may be acquired by one or more cameras. The visual information may represent a rail vehicle environment. The rail vehicle environment may include spaces in and around an interior and an exterior of the rail vehicle. The visual information may include views of exterior sides of the rail vehicle that capture visual images of events (e.g., collisions, near collisions, etc.) that occur at or near the sides of the rail vehicle, views of interior compartments of the rail vehicle, and/or other visual information. In some implementations, visual information representing the rail vehicle environment at or near ends of the rail vehicle may be acquired. In some implementations, the visual information may be received from a third party camera and/or digital video recorder (DVR) system. For example, such systems may include Panorama, a system previously installed in the rail vehicle, and/or other systems. Visual information may be received from a third party camera and or DVR system wirelessly and/or via wires.

Output signals may be generated by one or more sensors. The output signals may convey operation information related to operation and/or context of the rail vehicle. In some implementations, the output signals may convey information related to mechanical and/or safety subsystems of the rail vehicle. The output signals that convey information related to safety subsystems of the rail vehicle may include overspeed sensor information and/or other information, for example. In some implementations, the output signals may convey operation information related to operation of the rail vehicle at or near both ends of the rail vehicle. In some implementations, the output signals may convey information related to the environment around railcars of the rail vehicle. For example, such output signals may include information from a communications based train control (CBTC) system and/or other external signals received from third party rail safety products.

The processor may be configured to execute computer program components. The computer program components may include an event detection component, a storage component, a communication component, and/or other components.

Rail vehicle events may be detected by the event detection component. The rail vehicle events may be detected based on the output signals and/or other information. Electronic storage of rail vehicle event information may be facilitated by the storage component. The vehicle event information may be stored for a period of time that includes the rail vehicle event. The rail vehicle event information may include the operator identity information, the visual information, and the operation information for the period of time that includes the rail vehicle event.

Wireless communication of the rail vehicle event information may be facilitated by the communication component (e.g., via the transceiver). Wireless communication may be facilitated via the transceiver and/or wireless communication components configured to transmit and receive electronic information. In some implementations, the rail vehicle event information may be wirelessly communicated to a remote computing device via the wireless communication components, for example.

The system may be electrically isolated from the rail vehicle via an opto-isolator, an optical isolation circuit, and/or other isolation components. The opto-isolator may transfer electrical signals between two isolated circuits (e.g., a rail vehicle circuit and a rail vehicle event detection system circuit) using light. The opto-isolator may prevent unexpectedly high voltages in one circuit from being transferred to and/or damaging another circuit. The opto-isolator may couple an input current to an output current via a beam of light modulated by the input current. The opto-isolator may convert an input current signal into a light signal, send the light signal across a dielectric channel, capture the light signal on an output side of the dielectric channel, and then transform the light signal back into an electric signal (e.g., an output current).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
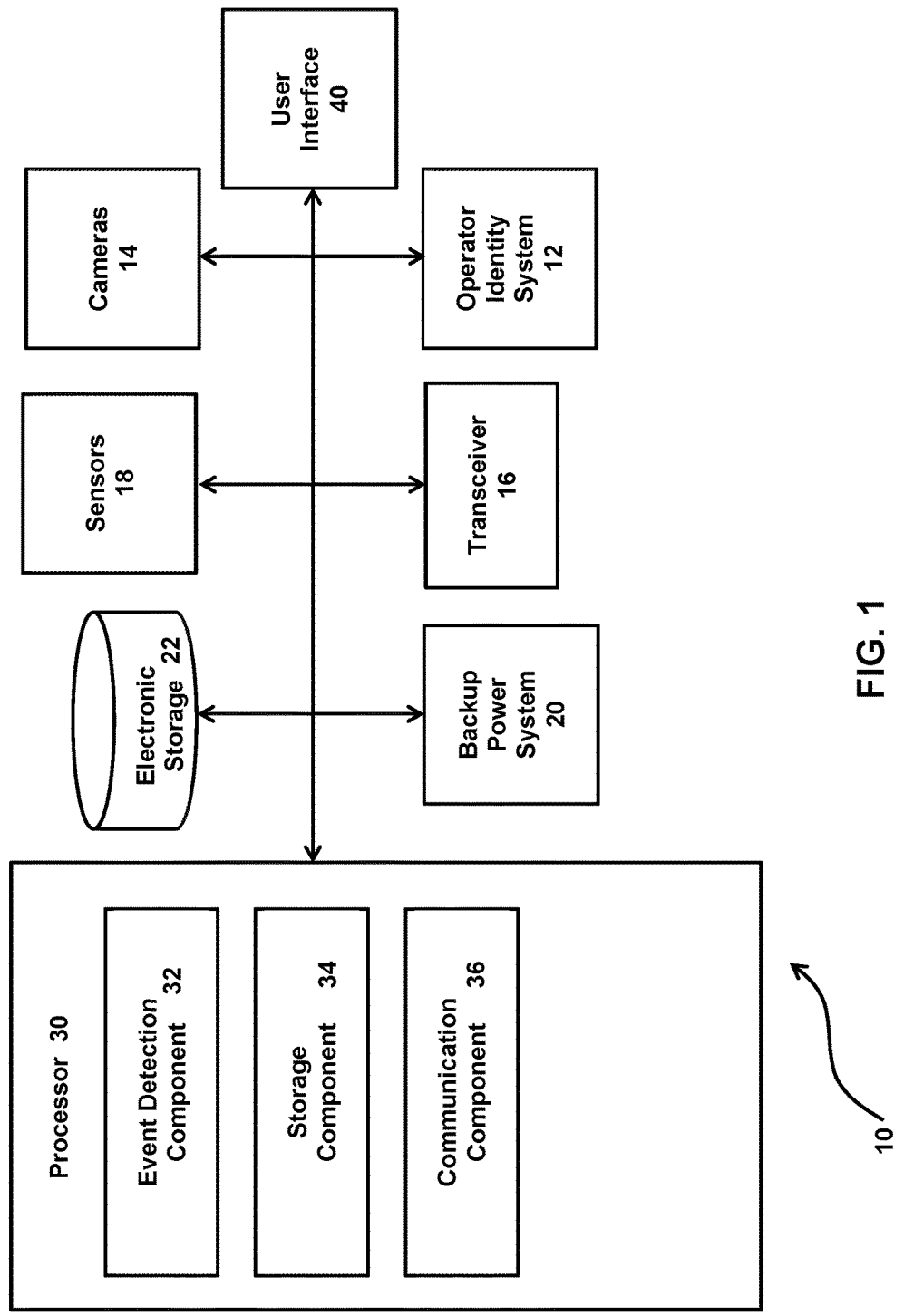
FIG. 1 illustrates a system configured to detect and record rail vehicle events.

FIG. 1 illustrates a system 10 configured to detect and record rail vehicle events. In some implementations, system 10 may include one or more of an operator identity system 12, a camera 14, a transceiver 16, a sensor 18, a backup power system 20, electronic storage 22, a processor 30, a user interface 40, and/or other components. System 10 is configured to be coupled with a rail vehicle. System 10 may be configured to monitor operation of the rail vehicle and/or determine whether rail vehicle events occur. By way of a non-limiting example, rail vehicle events may include collisions with other vehicles and/or pedestrians, near collisions, a specific behavior and/or driving maneuver performed by a rail vehicle operator (e.g., unsafe backing, unsafe braking, unsafe railroad crossing, unsafe turning, operating the rail vehicle with hands off of the control lever and/or any other similar maneuver such as operating the rail vehicle without a foot on a foot controller (for example), passing a signal bar, passing red over red, failure to yield to pedestrians, failure to yield to vehicles, speeding, not checking mirrors, not scanning the road/tracks ahead, not scanning an intersection, operating a personal electronic device, intercom responds, being distracted while eating, drinking, reading, etc., slingshotting, following or not following a transit agency's standard operating procedure), penalty stops, activation of a specific rail vehicle safety system (such as a track brake and/or an emergency brake), train operating parameters (e.g., speed) exceeding threshold values, improper stops at stations, and/or other rail vehicle events. Responsive to determining that a rail vehicle event has occurred, system 10 may be configured to record rail vehicle event information and/or transmit the recorded rail vehicle event information to one or more remotely located computing devices (e.g., wirelessly and/or via wires). The rail vehicle event information may include visual images of the environment about the rail vehicle (e.g., the exterior of the rail vehicle, streets surrounding rail tracks, passenger compartments, operator compartments, etc.), sensor information generated by rail vehicle system sensors and/or aftermarket sensors installed as part of system 10 (e.g., sensors 18), operator information, and/or other information.

Figure 2A:
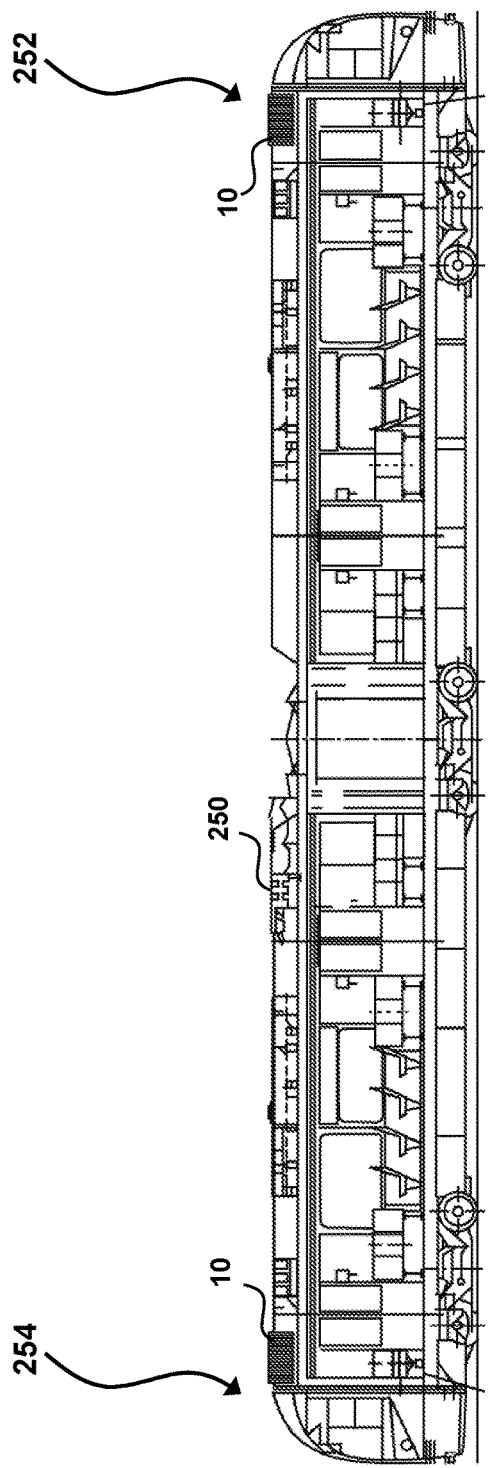
FIG. 2A illustrates the system and/or individual components of the system coupled with a rail vehicle at two locations.

In some implementations, system 10 and/or individual components of system 10 may be coupled with a rail vehicle at one or more locations on and/or within the rail vehicle. For example, FIG. 2A illustrates system 10 and/or individual components of system 10 coupled with a rail vehicle 250 at two locations 252 and 254 at or near the ends of the rail vehicle. This is not intended to be limiting. In some implementations, system 10 and/or individual components of system 10 may be coupled with rail vehicle 250 at any number of locations. In some implementations, system 10 may be coupled with rail vehicle 250 in locations that facilitate communication with one or more subsystems of rail vehicle 250.

Figure 2B:
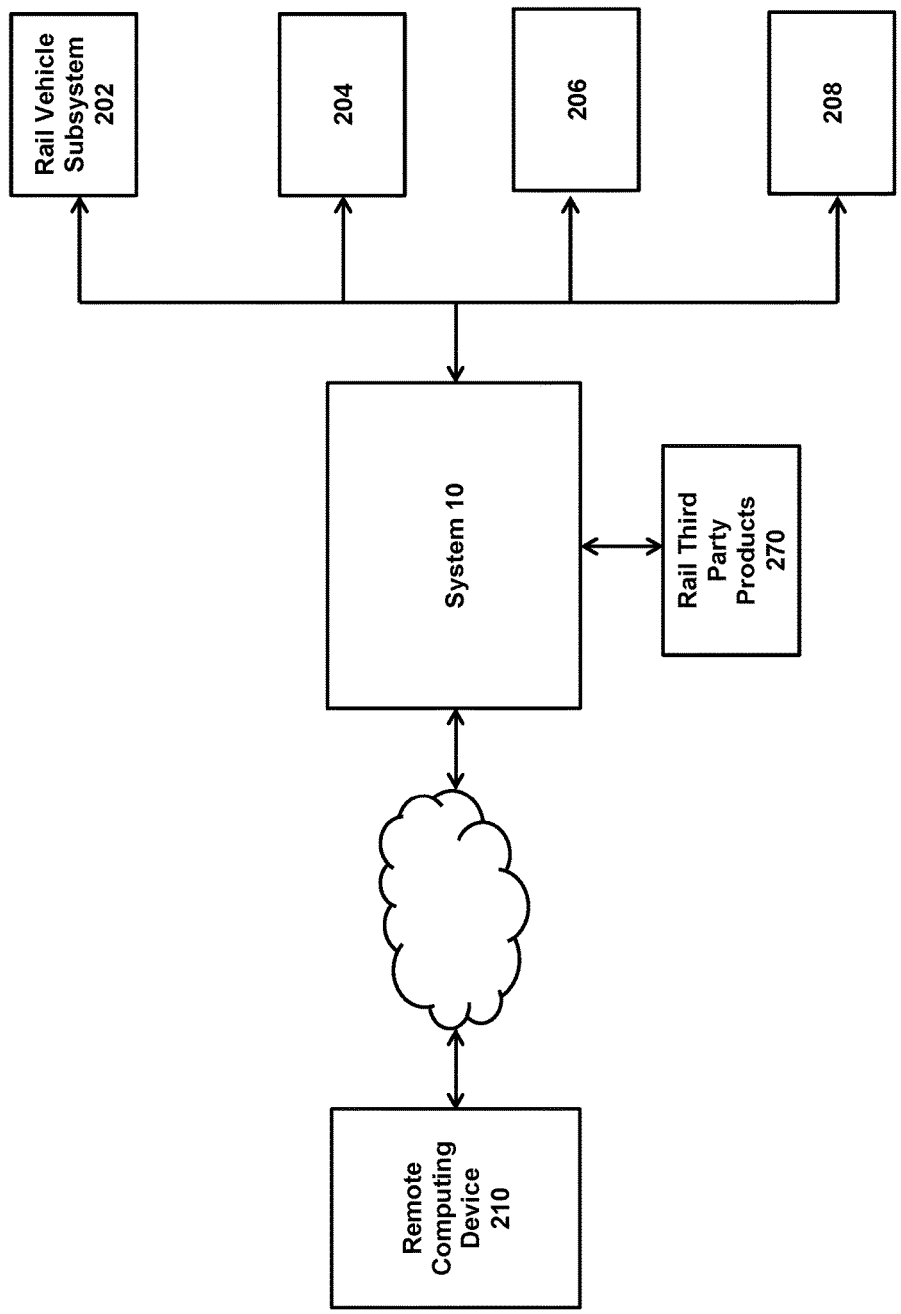
FIG. 2B illustrates the system in communication with rail vehicle subsystems and a remote computing device.

For example, FIG. 2B illustrates system 10 in communication with rail vehicle subsystems 202, 204, 206, and 208. Rail vehicle subsystems may include mechanical subsystems, vehicle safety subsystems, track safety subsystems, inter-railcars safety subsystems, camera subsystems, DVR subsytems, and/or other rail vehicle subsystems (further described below related to sensors 18). System 10 may be configured to be coupled with the rail vehicle subsystems so that information may be transmitted wirelessly and/or system 10 may be physically coupled with the rail vehicle subsystems via wires and/or other physical couplings. As shown in FIG. 2B, system 10 may be configured to communicate (e.g., wirelessly and/or via wires) with one or more remote computing devices 210. System 10 may communicate information (e.g., rail vehicle event information and/or other information) to remote computing device 210 and/or receive information from remote computing device 210 (e.g., information related to settings and/or other control of system 10, and/or other information.)

In some implementations, system 10 may be configured to communicate with other rail third part products 270 (DVR systems, safety systems, etc.). For example, system 10 may be configured to be physically coupled with a rail third party DVR system. As another example, system 10 may be configured to communicate with a CBTC safety system via a physical coupling. In some implementations, system 10 may be configured to communicate information to and/or receive information from third party products 270 wirelessly and/or via wires.

Remote computing device 210 may include one or more processors, a user interface, electronic storage, and/or other components. Remote computing device 210 may be configured to enable a user to interface with system 10, and/or provide other functionality attributed herein to remote computing device 210. Remote computing device 210 may be configured to communicate with system 10 via a network such as the internet, cellular network, Wi-Fi network, Ethernet, and other interconnected computer networks. Remote computing device 210 may facilitate viewing and/or analysis of the information conveyed by output signals of sensors 18 (FIG. 1), information determined by processor 30 (FIG. 1), information stored by electronic storage 22 (FIG. 1), and/or other information. By way of non-limiting example, remote computing device 210 may include one or more of a server, a server cluster, desktop computer, a laptop computer, a handheld computer, a tablet computing platform, a NetBook, a Smartphone, a gaming console, and/or other computing platforms.

As described above, in some implementations, remote computing device 210 may be and/or include a server. The server may include communication lines and/or ports to enable the exchange of information with a network, processor 30 of system 10, and/or other computing platforms. The server may include a plurality of processors, electronic storage, hardware, software, and/or firmware components operating together to provide the functionality attributed herein to remote computing device 210. For example, the server may be implemented by a cloud of computing platforms operating together as a system server.

Returning to FIG. 1, operator identity system 12 may be configured to receive operator identity information that identifies periods of time individual operators operate the rail vehicle. In some implementations, operator identity system 12 may be coupled with the rail vehicle and may be configured to receive entry and/or selection of the operator identity information from operators of the rail vehicle at the rail vehicle. For example, a rail vehicle operator may key in a specific identification code via a user interface located in the rail vehicle. In some implementations, operator identity system 12 may be configured to receive the operator identity information from a remotely located computing device (e.g., remote computing device 210 shown in FIG. 2B). In some implementations, the operator identity information may be received via a third party hardware platform configured (e.g., via software) to transmit the operator identity information to system 10.

In some implementations, operator identity system 12 may be configured to receive operator identity information from a biometric sensor configured to generate output signals that convey biometric information that identifies an individual operator of the rail vehicle. In some implementations, the biometric sensor may be worn by the operator. For example, such biometric sensors may include fingerprint scanning sensors, iris scanning sensors, sensors that generate output signals related to an electroencephalogram (EEG) of the operator used to uniquely identify the operator, sensors that generate output signals related to an electrocardiogram (ECG) of the operator used to uniquely identify the operator, sensors that generate output signals related to brain waves of the operator used to uniquely identify the operator, and/or other biometric sensors.

Cameras 14 may be configured to acquire visual information representing a rail vehicle environment. Any number of individual cameras 14 may be positioned at various locations on and/or within the rail vehicle. The rail vehicle environment may include spaces in and around an interior and/or an exterior of the rail vehicle. Cameras 14 may be configured such that the visual information includes views of exterior sides of the rail vehicle, interior compartments of the rail vehicle, and/or other areas to capture visual images of activities that occur at or near the sides of the rail vehicle, in front of and/or behind the rail vehicle, within the rail vehicle, on streets surrounding rail vehicle tracks, and/or in other areas. In some implementations, cameras 14 may include multiple cameras positioned around the rail vehicle and synchronized together to provide a 360 degree and/or other views of the inside of one or more portions of the rail vehicle (e.g., a driver compartment, a passenger compartment) and/or a 360 degree and/or other views of the outside of the vehicle (e.g., at or near a leading end of the rail vehicle looking ahead toward upcoming traffic, street crossings, etc.). In some implementations, the visual information may be received from a third party camera and/or digital video recorder (DVR) system. For example, such systems may include Panorama, a system previously installed in the rail vehicle, and/or other systems. Visual information may be received from a third party camera and or DVR system wirelessly and/or via wires.

Transceiver 16 may comprise wireless communication components configured to transmit and receive electronic information. In some implementations, processor 30 may be configured to facilitate wireless communication of rail vehicle event information to a remote computing device (e.g., remote computing device 210) via transceiver 16 and/or other wireless communication components. Transceiver 16 may be configured to transmit and/or receive encoded communication signals. Transceiver 16 may include a base station and/or other components. In some implementations, transceiver 16 may be configured to transmit and receive signals via one or more radio channels of a radio link. In some implementations, transceiver 16 may be configured to transmit and receive communication signals substantially simultaneously. Transmitting and/or receiving communication signals may facilitate communication between remote computing device 210 (FIG. 2B) and processor 30, for example.

Sensors 18 may be configured to generate output signals conveying operation information related to operation and/or context of the rail vehicle and/or other information. Information related to the operation of vehicle 12 may include feedback information from one or more subsystems of the rail vehicle, and/or other information. The subsystems may include, for example, the engine, the drive train, lighting systems (e.g., headlights, brake lights, train status indicator lights, track information lighting/signage), the braking system, power delivery (e.g., mechanical and/or electrical) systems, safety systems, radio systems, dispatch systems, and/or other subsystems. The subsystems of the rail vehicle may include one or more mechanical sensors, electronic sensors, and/or other sensors that generate output signals. In some implementations, sensors 18 may include at least one sensor that is a rail vehicle subsystem sensor associated with mechanical systems of the rail vehicle (e.g., the engine, drive train, lighting, braking, power delivery systems, etc). In some implementations, sensors 18 may include at least one sensor that is a rail vehicle subsystem sensor associated with a rail vehicle safety system configured to generate output signals conveying information related to safety systems of the rail vehicle. Rail vehicle safety subsystem sensors may include automatic train protection (ATP) sensors (e.g., ATP bypass active, ATP overspeed sensors), an automatic train control system (ATCS), track switches, track brake sensors, emergency brake sensors, intercom call sensors, a high horn sensor, a slingshotting sensor (e.g., a sensor that conveys output signals that indicate whether a side to side g-force at a last rail car when the rail car speed is too high causes passenger discomfort, has the potential to cause derailment, an/or may cause damage to the rail car and/or the track), and/or other sensors.

Information related to the context of the rail vehicle may include information related to the environment in and/or around the rail vehicle. The vehicle environment may include spaces in and around an interior and an exterior of the rail vehicle. The information related to the context of the rail vehicle may include information related to movement of the rail vehicle, an orientation of the rail vehicle, a geographic position of the rail vehicle, a spatial position of the rail vehicle relative to other objects, a tilt angle of rail vehicle, and/or other information. In some implementations, the output signals conveying the information related to the context of the rail vehicle may be generated via non-standard aftermarket sensors installed in the rail vehicle and/or other sensors. The non-standard aftermarket sensor may include, for example, a video camera (e.g., cameras 14), a microphone, an accelerometer, a gyroscope, a geolocation sensor (e.g., a GPS device), a radar detector, a magnetometer, radar, biometric sensors, an intercom, an active safety sensor that utilizes a camera such as Mobile Eye and/or Bendex, and/or other sensors. In some implementations, the output signals may include information from a communications based train control (CBTC) system and/or other external signals received from third party rail safety products.

Although sensors 18 are depicted in FIG. 1 as a single element, this is not intended to be limiting. Sensors 18 may include one or more sensors located adjacent to and/or in communication with the various mechanical systems of the rail vehicle, adjacent to and/or in communication with the various safety systems of the rail vehicle, in one or more positions (e.g., at or near the front/rear of the rail vehicle) to accurately acquire information representing the vehicle environment (e.g. visual information, spatial information, orientation information), and/or in other locations. For example, in some implementations, system 10 may be configured such that a first sensor is located in a driver compartment of the rail vehicle near operational control used to operate the rail vehicle and a second sensor is located on top of the rail vehicle and is in communication with a geolocation satellite. In some implementations, sensors 18 are configured to generate output signals substantially continuously during operation of the rail vehicle.

One or more components of system 10 may be electrically coupled with the rail vehicle such that the one or more components of system 10 may be powered by electrical power from the rail vehicle. The one or more components of system 10 may be individually electrically coupled to the rail vehicle and/or the components of system 10 may be electrically coupled to the rail vehicle via common electrical connection. Backup power system 20 may be configured to provide electrical power to system 10 responsive to power received by the system 10 from the rail vehicle ceasing. (Power from the rail vehicle may cease for various reasons such as turning the rail vehicle ignition off, mechanical malfunctions, criminal activity, and/or other events where it would be advantageous for system 10 to continue to operate). Power system 20 may be configured to power operator identity system 12, cameras 14, transceiver 16, sensors 18, processor 30, user interface 40, electronic storage 22, and/or other components of system 10. Power system 20 may comprise one or more power sources connected in series and/or in parallel. In some implementations, power system 20 may be rechargeable. Power system 20 may be recharged via an AC power source, a rail vehicle power source, a USB port, a non-contact charging circuit, and/or other recharging methods. Examples of power sources that may be included backup power system 20 include one or more DC batteries, Lithium Ion and/or Lithium Polymer Cells, Nickel Metal Hydride, and/or other power sources.

Electronic storage 22 may be configured to store electronic information. Electronic storage 22 may comprise electronic storage media that electronically stores information. The electronic storage media of electronic storage 22 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22 may store software algorithms, recorded video event data, information determined by processor 30, information received via user interface 40, and/or other information that enables system 10 to function properly. Electronic storage 22 may be (in whole or in part) a separate component within system 10, or electronic storage 22 may be provided (in whole or in part) integrally with one or more other components of system 10 (e.g., user interface 40, processor 30, etc.).

Processor 30 may be configured to provide information processing capabilities in system 10. As such, processor 30 may comprise one or more of a digital processor, an analog processor, a digital circuit designed to process information, an analog circuit designed to process information, a state machine, and/or other mechanisms for electronically processing information. Although processor 30 is shown in FIG. 1 as a single entity, this is for illustrative purposes only. In some implementations, processor 30 may comprise a plurality of processing units. These processing units may be physically located within the same device, or processor 30 may represent processing functionality of a plurality of devices operating in coordination.

Processor 30 may be configured to execute one or more computer program components. The computer program components may comprise one or more of an event detection component 32, a storage component 34, a communication component 36, and/or other components. Processor 30 may be configured to execute components 32, 34, and/or 36 by software; hardware; firmware; some combination of software, hardware, and/or firmware; and/or other mechanisms for configuring processing capabilities on processor 30. It should be appreciated that although components 32, 34, and 36 are illustrated in FIG. 1 as being co-located within a single processing unit, in implementations in which processor 30 comprises multiple processing units, one or more of components 32, 34, and/or 36 may be located remotely from the other components. The description of the functionality provided by the different components 32, 34, and/or 36 described herein is for illustrative purposes, and is not intended to be limiting, as any of components 32, 34, and/or 36 may provide more or less functionality than is described. For example, one or more of components 32, 34, and/or 36 may be eliminated, and some or all of its functionality may be provided by other components 32, 34, and/or 36. As another example, processor 30 may be configured to execute one or more additional components that may perform some or all of the functionality attributed below to one of components 32, 34, and/or 36.

Event detection component 32 may be configured to detect rail vehicle events based on the output signals from sensors 18 and/or other information. In some implementations, event detection component 32 may determine one or more rail vehicle parameters based on the output signals and/or other information. In some implementations, event detection component 32 may determine rail vehicle parameters that are not directly measurable by sensors 18. In some implementations, event detection component 32 may be configured to determine one or more rail vehicle parameters one or more times in an ongoing manner during operation of the rail vehicle. Event detection component 32 may be configured to detect rail vehicle events based on the information conveyed by the output signals generated by sensors 18, the rail vehicle parameters, pre-determined rail vehicle event criteria, and/or based on other information. A specific rail vehicle event may be detected based on the sensor information, the determined parameters, and the obtained vehicle event criteria by comparing the information conveyed by the output signals and/or the determined vehicle parameters to rail vehicle event criteria sets such that a first rail vehicle event is detected responsive to the output signals and/or the determined parameters satisfying one or more individual criteria in a first criteria set associated with a first vehicle event.

Storage Component 34 may be configured to facilitate electronic storage of rail vehicle event information for a period of time that includes the rail vehicle event. The rail vehicle event information may be stored in non-transient electronic storage 22, electronic storage included in remote computing device(s) 210 (FIG. 2B), and/or in other locations. The rail vehicle event information may include the visual information from one or more cameras 14, the operation information from one or more sensors 18 for the period of time that includes the rail vehicle event, operator identity information, and/or other information. In some implementations, storage component 34 may be configured such that operator identity information for the period of time that includes the rail vehicle event is included in the rail vehicle event information. In some implementations, storage component 34 may be configured to synchronize the operator identity information, the visual information, the operation information, and/or other information with respect to time. For example, visual information from various cameras 14 may be synchronized with information conveyed by the output signals from various sensors 18 by storage component 34.

Communication component 36 may be configured to facilitate wireless communication of information conveyed by the output signals, the determined parameters, the rail vehicle event information, and/or other information to remote computing device 210 (FIG. 2B) and/or other devices. Communication component 36 may be configured to facilitate communication via one or more of a WiFi network, a cellular network, an Ethernet network, and/or other network communication solutions. Communication component 36 may be configured such that a user of system 10 may choose one communication solution to start with and, without changing the hardware of system 10, change the solution to any other available communication solution any time the user requests a change. Communication component 36 may be configured to facilitate communication responsive to the detection of a rail vehicle event. Communication component 36 may be configured to facilitate communication in real-time or near real-time. For example, communication component 36 may facilitate one or more individual communications during operation of the rail vehicle. Individual communications may be responsive to a detected rail vehicle event and may occur just after detection of an individual rail vehicle event. In some implementations, communication component 36 may be configured to facilitate communication after use of the rail vehicle has ceased such that the information conveyed by the output signals, the determined parameters, rail vehicle event information, and/or other information is communicated in a single communication. In some implementations, communication component 36 may be configured to associate visual and/or other information in the output signals of the one or more cameras 14 with information related to operation and/or context of the vehicle (e.g., vehicle subsystem sensors and/or aftermarket sensors 18).

User interface 40 may be configured to provide an interface between system 10 and users through which the users may provide information to and receive information from system 10. This enables pre-determined profiles, criteria, data, cues, results, instructions, and/or any other communicable items, collectively referred to as "information," to be communicated between a user and one or more of processor 30, sensors 18, remote computing device 210 (shown in FIG. 2B), operator identity system 12, cameras 14, electronic storage 22, backup power system 20, rail vehicle subsystems 202-208 (shown in FIG. 2B), and/or other components of system 10. In some implementations, all and/or part of user interface 40 may be included in remote computing device 210, operator identity system 12, and/or other components of system 10. In some implementations, user interface 40 may be included in a housing with one or more other components (e.g., processor 30) of system 10.

Examples of interface devices suitable for inclusion in user interface 40 comprise a keypad, buttons, switches, a keyboard, knobs, levers, a display screen, a touch screen, speakers, a microphone, an indicator light, an audible alarm, a printer, a tactile feedback device, and/or other interface devices. In one implementation, user interface 40 comprises a plurality of separate interfaces. In some implementations, user interface 40 comprises at least one interface that is provided integrally with processor 30 and/or electronic storage 22.

It is to be understood that other communication techniques, either hard-wired or wireless, are also contemplated by the present disclosure as user interface 40. In some implementations, user interface 40 may be included in a removable storage interface provided by electronic storage 22. In this example, information may be loaded into system 10 wirelessly from a remote location (e.g., via a network), from removable storage (e.g., a smart card, a flash drive, a removable disk, etc.), and/or other sources that enable the user(s) to customize the implementation of system 10. Other exemplary input devices and techniques adapted for use with system 10 as user interface 40 comprise, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as user interface 40.

User interface 40, communication component 36, remote computing device 210 (FIG. 2B) and/or other components of system 10 may be configured to facilitate review of the rail vehicle event information and/or communication with an operator of the rail vehicle. In some implementations, the review and/or communication may be facilitated in real time or near real time to provide feedback to an operator about his performance. For example, a remotely located reviewer may review rail vehicle event information recently transmitted (e.g., by communication component 36 via transceiver 16) to remote computing device 210. The remote reviewer may look for behaviors such as unsafe backing, unsafe braking, unsafe railroad crossing, unsafe turning, operating the vehicle with hands and/or feet off of a control lever, passing a signal bar, passing red over red, failure to yield to pedestrians, failure to yield to vehicles, speeding, not checking mirrors, not scanning the road/tracks ahead, not scanning an intersection, operating a personal electronic device, being distracted by eating/drinking/reading/etc., improper stops at stations, speeding, following too close behind another train, and/or other dangerous behaviors. Based on his review of the driver's technique, the reviewer may send a message back to the rail vehicle operators which the rail vehicle operator may receive via user interface 40, for example. In some implementations, communication component 36, remote computing device 210 and/or other components of system 10 may be configured to facilitate automatic analysis of rail vehicle event information and alert (e.g., via text message, email, a phone call, via an indicator displayed by user interface 40, etc.) reviewers, rail vehicle operators, and/or other users.

Figure 3:
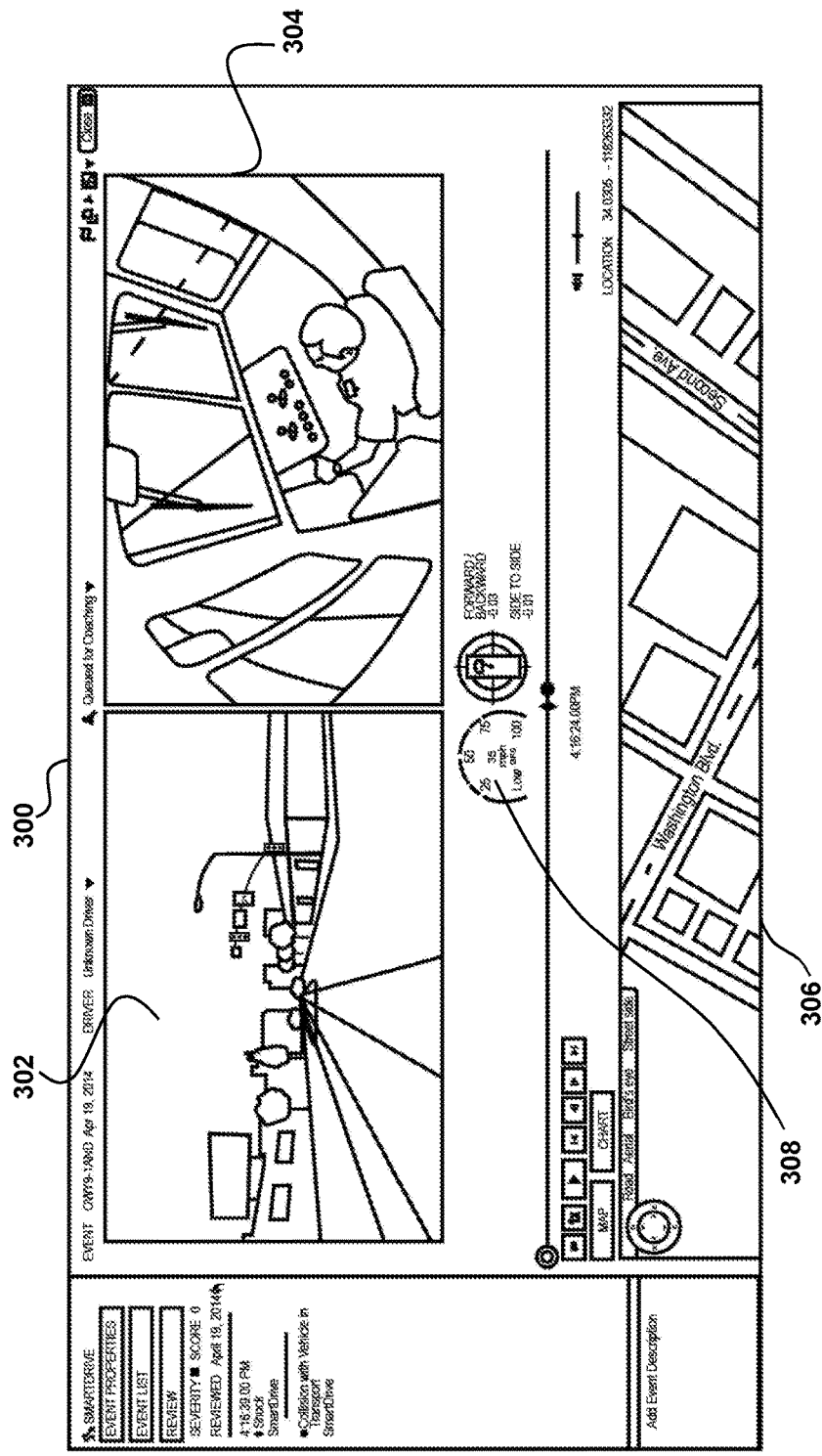
FIG. 3 illustrates an example view of a graphical user interface presented to the reviewer via a remote computing device.

FIG. 3 illustrates an example view 300 of a graphical user interface presented to the reviewer via remote computing device 210 (FIG. 2B), for example. View 300 includes a forward looking camera field 302, a driver camera field 304, a map field 306, rail vehicle subsystems information fields 308, and/or other fields. These fields may facilitate review of the operator's performance and/or other information before, during, and/or after a rail vehicle event, and/or at other times. FIG. 3 is not intended to be limiting. The graphical user interface may include any number of views and/or fields. The graphical user interface may be presented to a reviewer via user interface 40. As described above, some or all of user interface 40 may be included in remote computing device 210 and/or the rail vehicle.

Figure 4A:
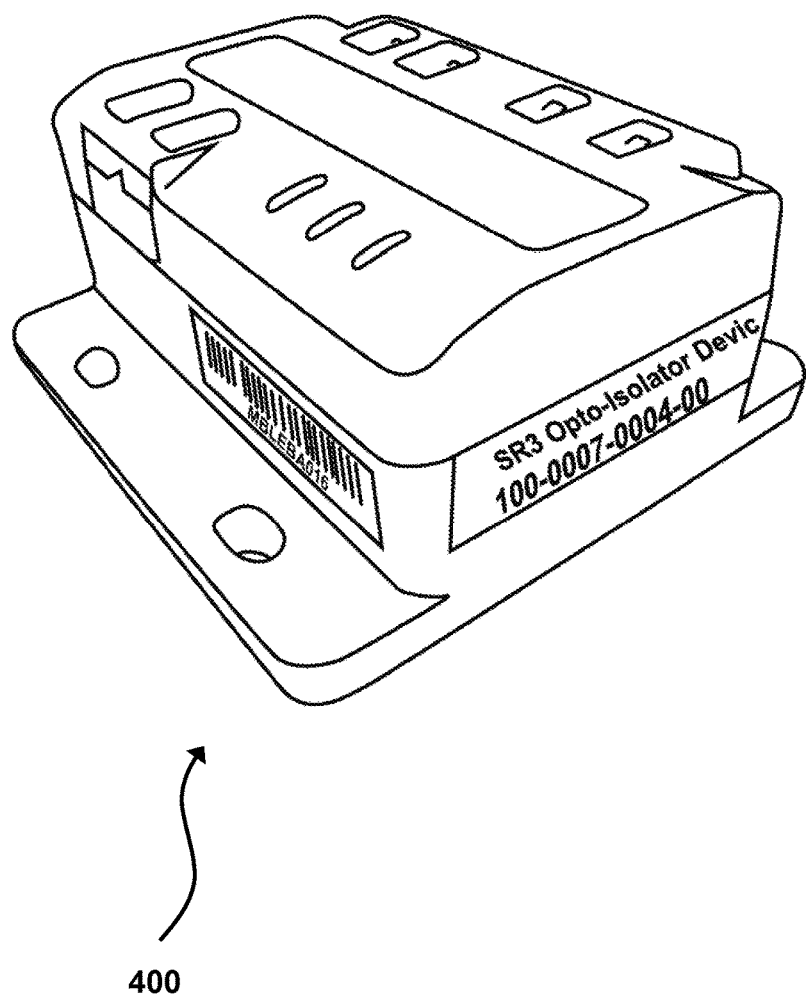
FIG. 4A illustrates an opto-isolator.
Figure 4B:
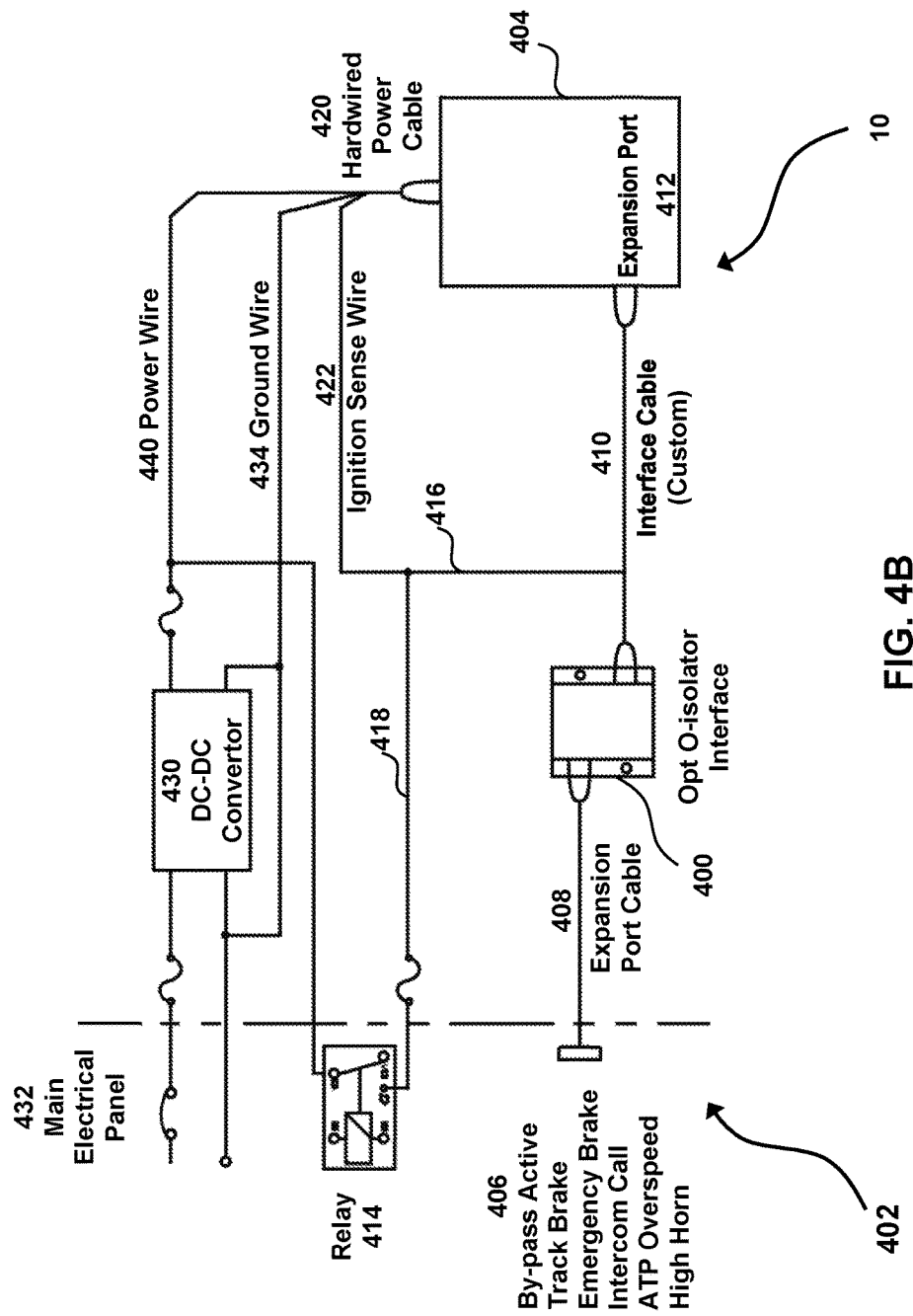
FIG. 4B illustrates an isolation circuit.

In some implementations, system 10 may be electrically isolated from the rail vehicle. System 10 may be electrically isolated from the rail vehicle via an opto-isolator, an optical isolation circuit, and/or other isolation components. An opto-isolator 400 is illustrated in FIG. 4A. As shown in FIG. 4A, opto-isolator 400 may be a stand-alone component within system 10. An isolation circuit 402 is illustrated in FIG. 4B. As shown in FIG. 4B, opto-isolator 400 may be electrically coupled to one or more safety systems 406 of the rail vehicle via an expansion port cable 408. Opto-isolator 400 may be electrically coupled to a housing 404 that houses one or more components of system 10 via a custom interface cable 410 and/or an expansion port 412. In some implementations, custom interface cable 410 may be electrically coupled to a relay 414 via coupling wires 416, 418. Housing 404 may be coupled to a hardwired power cable 420 (separately from expansion port 412). Hardwired power cable 420 may be electrically coupled with relay 414 via an ignition sense wire 422 and/or coupling wire 418. (In some implementations ignition sense wire and coupling wire 418 may be the same wire.) Hardwired power cable 420 may be electrically coupled with a negatively charged portion of a main electrical panel 432 of the rail vehicle and/or a DC-DC converter 430 via a ground wire 434. Hardwired power cable 420 may be electrically coupled with a positively charged portion of main electrical panel 432 and/or converter 430 via a power wire 440.

Referring to FIGS. 4A and 4B, opto-isolator 400 may transfer electrical signals between two isolated circuits (e.g., a rail vehicle circuit and a rail vehicle event detection system circuit) using light. Opto-isolator 400 may prevent unexpectedly high voltages in one circuit (e.g., the rail vehicle circuit) from being transferred to and/or damaging another circuit (e.g., the rail vehicle event detection system circuit). Opto-isolator 400 may couple an input current to an output current via a beam of light modulated by the input current. Opto-isolator 400 may convert the input current signal into a light signal, send the light signal across a dielectric channel, capture the light signal on an output side of the dielectric channel, and then transform the light signal back into an electric signal (e.g., an output current).

In some implementations, opto-isolator 400 may be configured to provide multiple (e.g., six) inputs driving a corresponding number (e.g., 6) optically isolated outputs. One of the inputs may provide a time delay function that requires the input signal to remain present for a minimum number (e.g., 5) of seconds before the signal is output to expansion port 412. The time delay may be enabled or disabled via a printed circuit board (PCB) jumper. When disabled, the input may function identically to the other (e.g., five) inputs. Inputs may present as high as practical impedance for the rail vehicle source signals, whether powered or not. Power to drive the inputs may be supplied by the rail vehicle. By way of a non-limiting example, voltages between about 5V and about 50V may be considered a high signal. Inputs below about 2V may be considered a low signal. Inputs may include a selectable 3X attenuator to increase noise margins if necessary. Inputs may provide about 100V transient protection. Outputs may be optically isolated from the inputs. Output power may be provided by the same power source (e.g., a rail vehicle power source) that drives other components of system 10. Output states may mimic the input states (e.g., high in =high out). The output circuit may provide a minimum of about 7 volts with about a 5 mA load in the high state to ensure proper operation of expansion port 412.

Figure 5:
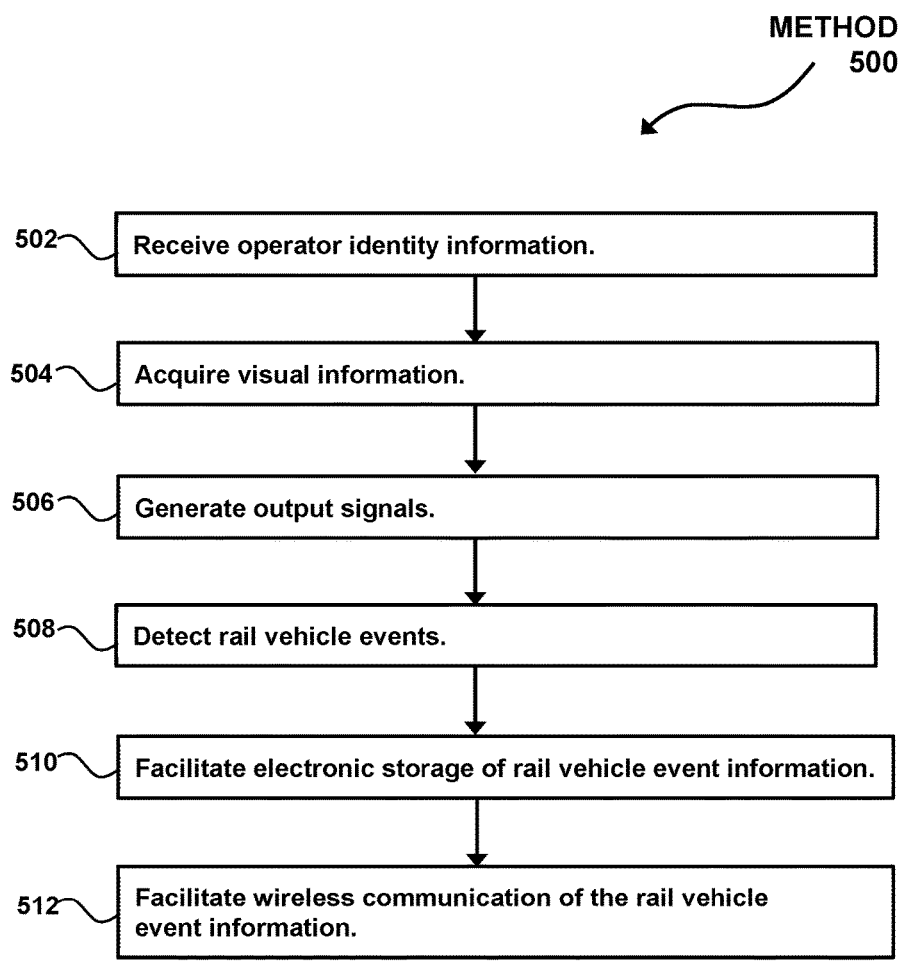
FIG. 5 illustrates a method for detecting and recording rail vehicle events.

FIG. 5 illustrates a method 500 for detecting and recording rail vehicle events. The rail vehicle events may be detected and recorded with a rail vehicle event detection system configured to be coupled with a rail vehicle. In some implementations, the rail vehicle event detection system may be electrically isolated from the rail vehicle (e.g., via an opto-isolator). The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on one or more electronic storage mediums. The one or more processing devices may include one or more devices configured through hardware, firmware, and/or software to be specifically designed for execution of one or more of the operations of method 500.

At an operation 502, operator identity information may be received. The operator identity information may identify periods of time that individual operators operate the rail vehicle. In some implementations, receiving operator identity information may include receiving entry and/or selection of the operator identity information from operators of the rail vehicle at the rail vehicle. In some implementations, receiving operator identity information may include receiving the operator identity information from a remotely located computing device. In some implementations, receiving operator identity information may include receiving operator identity information from a biometric sensor configured to generate output signals that convey biometric information that identifies an individual operator of the rail vehicle. In some implementations, operation 502 may be performed by one or more operator identity systems the same as or similar to operator identity system 12 (shown in FIG. 1 and described herein).

At an operation 504, visual information may be acquired. The visual information may represent a rail vehicle environment. The rail vehicle environment may include spaces in and around an interior and an exterior of the rail vehicle. The visual information may include views of exterior sides of the rail vehicle that capture visual images of collisions that occur at the sides of the rail vehicle, passengers entering and/or exiting the rail vehicle, wheelchair loading and/or offloading, and/or other visual information. In some implementations, visual information representing the rail vehicle environment at or near both ends of the rail vehicle may be acquired. In some implementations, operation 504 may be performed by one or more cameras the same as or similar to cameras 14 (shown in FIG. 1 and described herein).

At an operation 506, output signals may be generated. The output signals may convey operation information related to operation of the rail vehicle. In some implementations, the output signals convey information related to safety systems of the rail vehicle. The output signals that convey information related to safety systems of the rail vehicle may include overspeed sensor information and/or other information. In some implementations, the output signals may convey operation information related to operation of the rail vehicle at or near both ends of the rail vehicle. In some implementations, the output signals may be communicated via wires and/or wirelessly using WiFi, Blutooth, radio signals, a wireless network such as the internet and/or a cellular network, and/or other communication techniques. In some implementations, operation 506 may be performed by one or more sensors the same as or similar to sensors 18 (shown in FIG. 1 and described herein).

At an operation 508, rail vehicle events may be detected. The rail vehicle events may be detected based on the output signals and/or other information. In some implementations, operation 508 may be performed by a processor component the same as or similar to event detection component 32 (shown in FIG. 1 and described herein).

At an operation 510, electronic storage of rail vehicle event information may be facilitated. The vehicle event information may be stored for a period of time that includes the rail vehicle event. The rail vehicle event information may include the visual information and the operation information for the period of time that includes the rail vehicle event. In some implementations, operation 510 may be performed by a processor component the same as or similar to storage component 34 (shown in FIG. 1 and described herein).

At an operation 512, wireless communication of the rail vehicle event information may be facilitated. Wireless communication may be facilitated via wireless communication components configured to transmit and receive electronic information. In some implementations, the rail vehicle event information may be wirelessly communicated to a remote computing device via the wireless communication components. In some implementations, operation 512 may be performed by a processor component the same as or similar to communication component 36 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A rail vehicle event detection system configured to be used with a rail vehicle having a driver compartment, wherein the rail vehicle event detection system is configured to be protected from different types of failures, the system comprising:

a backup power system configured to provide electrical power to the rail vehicle event detection system, wherein the backup power system is independent from a main power system configured to provide electrical power to the rail vehicle, and wherein the backup power system is configured to provide electrical power to the rail vehicle event detection system responsive to a failure by the main power system to provide electrical power to the rail vehicle event detection system;

an isolation circuit including an opto-isolator, wherein the isolation circuit is configured to transfer signals between isolated circuits across one or more dielectric channels;

one or more cameras configured to acquire visual information representing a rail vehicle environment, the rail vehicle environment including spaces in and around an interior and an exterior of the rail vehicle, wherein the one or more cameras include an interior camera configured to acquire interior visual information of the driver compartment of the rail vehicle;

one or more sensors configured to generate output signals conveying operation information related to operation of the rail vehicle, wherein at least one of the one or more sensors is associated with a rail vehicle safety system and configured to generate an output signal conveying information related to the rail vehicle safety system;

wherein the opto-isolator of the isolation circuit is configured such that one or more inputs of the opto-isolator are electrically coupled to the rail vehicle safety system via an expansion port cable, and further such that one or more outputs of the opto-isolator that correspond to the one or more inputs of the opto-isolator are coupled to the rail vehicle event detection system;

wireless communication components configured to transmit and receive electronic information; and one or more physical computer processors configured by computer readable instructions to:

detect a rail vehicle event based on the output signals; and facilitate wireless communication of rail vehicle event information to a remote computing device via the wireless communication components, wherein the rail vehicle event information includes, for a period of time that includes the rail vehicle event, (i) the visual information from the one or more cameras, (ii) the operation information from the one or more sensors, and (iii) the interior visual information of the driver compartment of the rail vehicle.

2. The system of claim 1, further comprising non-transient electronic storage configured to store electronic information, wherein the one or more physical computer processors are further configured to facilitate storage of the rail vehicle event information in the non-transient electronic storage.

3. The system of claim 2, wherein the wireless communication components are further configured to transmit the rail vehicle event information from the non-transient electronic storage to the remote computing device.

4. The system of claim 1, further comprising an operator identity system configured to receive operator identity information that identifies periods of time individual operators operate the rail vehicle, wherein the one or more physical computer processors are configured such that operator identity information for the period of time that includes the rail vehicle event is included in the rail vehicle event information.

5. The system of claim 4, wherein the operator identity system is coupled with the rail vehicle and is configured to receive entry and/or selection of the operator identity information from operators of the rail vehicle at the rail vehicle.

6. The system of claim 4, wherein the operator identity system is configured to receive operator identity information from a biometric sensor configured to generate biometric output signals that convey biometric information that identifies an individual operator of the rail vehicle.

7. The system of claim 1, wherein the one or more cameras are configured such that the visual information includes views of exterior sides of the rail vehicle to capture visual images of collisions that occur at the sides of the rail vehicle.

8. A method for detecting and recording rail vehicle events with a rail vehicle event detection system configured to be used with a rail vehicle having a driver compartment, the rail vehicle event detection system being protected from different types of failures, the method comprising:
providing, by a backup power system, electrical power to the rail vehicle event detection system, wherein the backup power system is independent from a main power system that provides electrical power to the rail vehicle, and wherein the backup power system provides electrical power to the rail vehicle event detection system responsive to a failure by the main power system to provide electrical power to the rail vehicle event detection system;
transferring signals, by an isolation circuit that includes an opto-isolator, between isolated circuits across one or more dielectric channels;
acquiring, by one or more cameras, visual information representing a rail vehicle environment, the rail vehicle environment including spaces in and around an interior and an exterior of the rail vehicle, wherein acquiring visual information includes acquiring, by an interior camera, interior visual information of the driver compartment of the rail vehicle;
generating, by one or more sensors, output signals conveying operation information related to operation of the rail vehicle, wherein at least one of the one or more sensors is associated with a rail vehicle safety system and generates an output signal conveying information related to the rail vehicle safety system, wherein the opto-isolator of the isolation circuit electrically couples one or more inputs of the opto-isolator to the rail vehicle safety system via an expansion port cable, and wherein the opto-isolator of the isolation circuit further couples one or more outputs of the opto-isolator that correspond to the one or more inputs of the opto-isolator to the rail vehicle event detection system;
detecting a rail vehicle event based on the output signals; and
facilitating wireless communication of rail vehicle event information to a remote computing device via wireless communication components, wherein the rail vehicle event information includes, for a period of time that includes the rail vehicle event,
(i) the visual information from the one or more cameras,
(ii) the operation information from the one or more sensors, and
(iii) the interior visual information of the driver compartment of the rail vehicle.

9. The method of claim 8, further comprising:
facilitating storage of the rail vehicle event information in non-transient electronic storage.

10. The method of claim 9, further comprising:
transmitting the rail vehicle event information from the non-transient electronic storage to the remote computing device.

11. The method of claim 8, further comprising receiving operator identity information that identifies periods of time individual operators operate the rail vehicle, wherein the operator identity information for the period of time that includes the rail vehicle event is included in the rail vehicle event information.

12. The method of claim 11, further comprising receiving entry and/or selection of the operator identity information from operators of the rail vehicle at the rail vehicle.

13. The method of claim 11, further comprising receiving operator identity information from a biometric sensor that generates biometric output signals that convey biometric information that identifies an individual operator of the rail vehicle.

14. The method of claim 8, wherein the visual information includes views of exterior sides of the rail vehicle to capture visual images of collisions that occur at the sides of the rail vehicle.

* * * * *